(12) United States Patent
Faith et al.

(10) Patent No.: US 8,733,632 B2
(45) Date of Patent: May 27, 2014

(54) MOBILE SUBSCRIBER DEVICE FOR FINANCIAL TRANSACTION TOKENS

(75) Inventors: Patrick L. Faith, Pleasanton, CA (US); Ayman A. Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1004 days.

(21) Appl. No.: 11/767,185

(22) Filed: Jun. 22, 2007

(65) Prior Publication Data

US 2008/0314971 A1 Dec. 25, 2008

(51) Int. Cl.
*G06Q 40/00* (2012.01)

(52) U.S. Cl.
USPC .......... 235/379; 235/441; 235/451; 235/380; 235/492

(58) Field of Classification Search
None
See application file for complete search history.

(56) References Cited

U.S. PATENT DOCUMENTS

| | | | |
|---|---|---|---|
| 2006/0163349 A1 | 7/2006 | Neugebauer | |
| 2006/0208066 A1 | 9/2006 | Finn et al. | |
| 2007/0096870 A1* | 5/2007 | Fisher | 340/5.53 |
| 2007/0108269 A1* | 5/2007 | Benco et al. | 235/380 |
| 2007/0125840 A1* | 6/2007 | Law et al. | 235/379 |
| 2007/0135164 A1* | 6/2007 | Lee | 455/558 |
| 2007/0145135 A1* | 6/2007 | Jogand-Coulomb et al. | 235/451 |
| 2008/0126261 A1* | 5/2008 | Lovett | 705/72 |
| 2008/0297350 A1* | 12/2008 | Iwasa et al. | 340/572.1 |
| 2010/0044444 A1* | 2/2010 | Jain et al. | 235/492 |

* cited by examiner

*Primary Examiner* — Sonji Johnson
(74) *Attorney, Agent, or Firm* — Kilpatrick Townsend Stockton LLP

(57) ABSTRACT

There is provided a mobile subscriber unit for a financial transaction token. The subscriber unit interfaces with a financial token or card that is in communication with the subscriber unit. The financial token or card has an onboard energy source so that the card token may operate away from proximity to a merchant terminal (e.g.; a POS terminal). In one implementation, the onboard power storage device includes a rechargeable battery or capacitor such as a thin-film capacitor that stores sufficient energy to power the subscriber unit's onboard electronics and/or the electronics of a financial token in communication with the subscriber unit. The subscriber unit may be a component of another consumer device such as a computing device, communications device, an item of clothing, an item of jewelry, a cell phone, a PDA, an identification card, a money holder, a wallet, a purse, a briefcase, or a personal organizer.

40 Claims, 9 Drawing Sheets

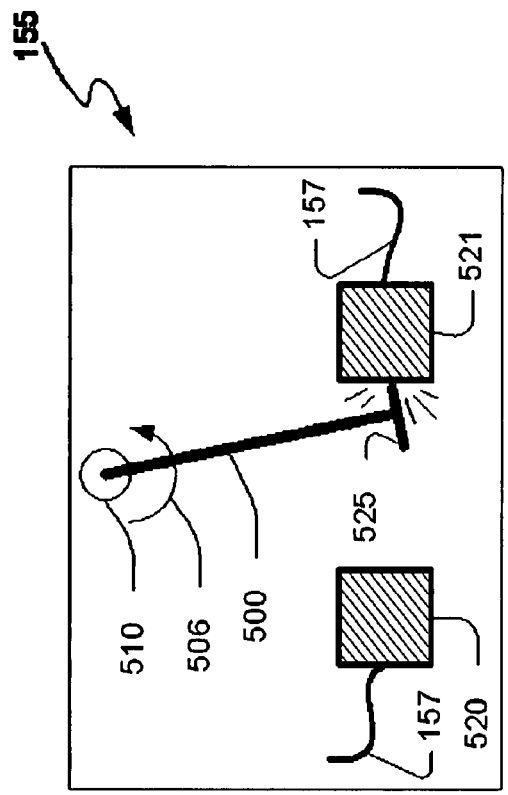
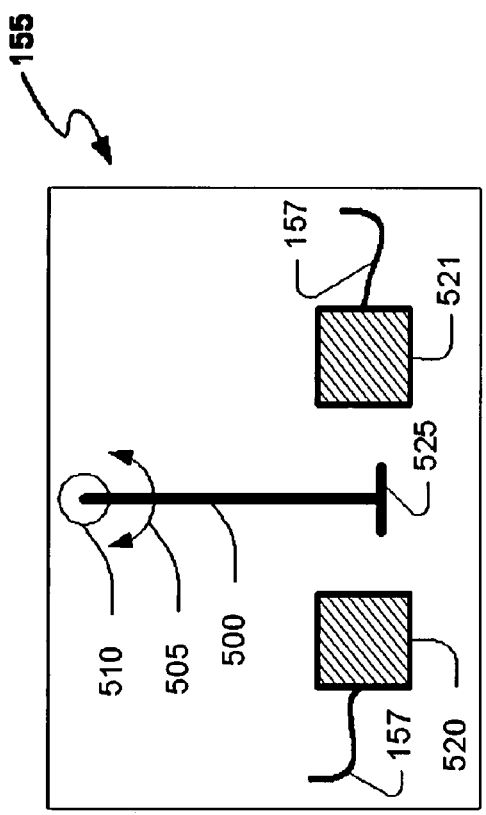

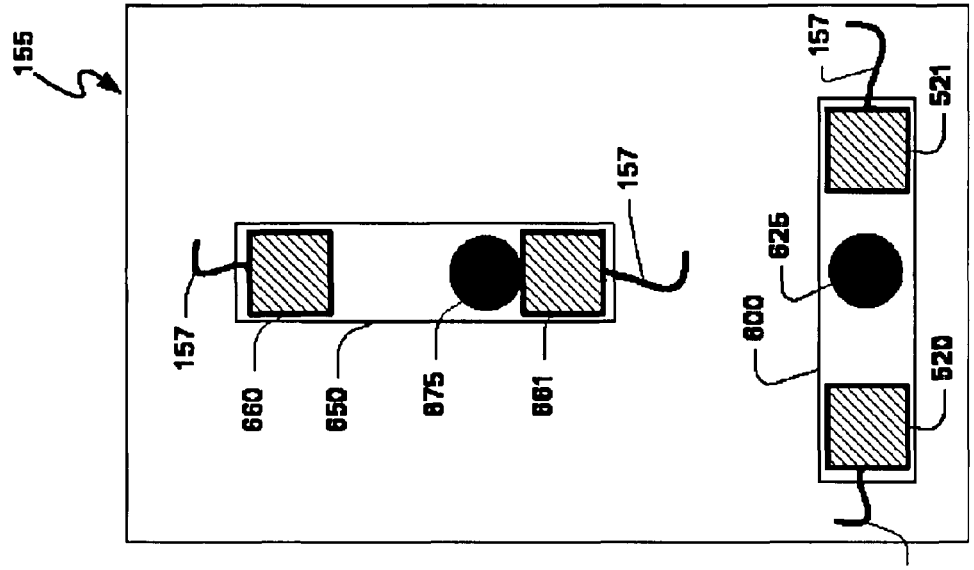
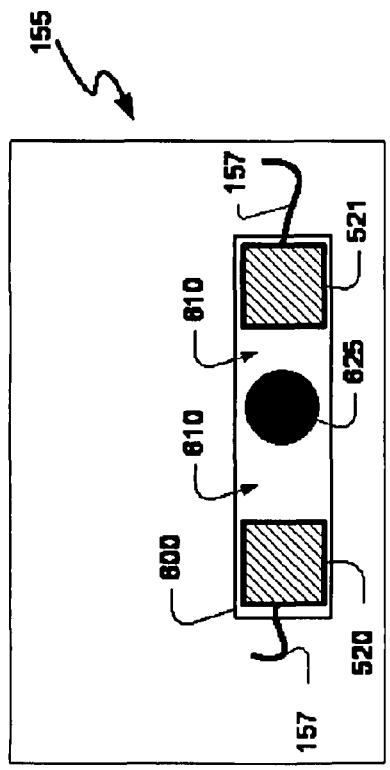
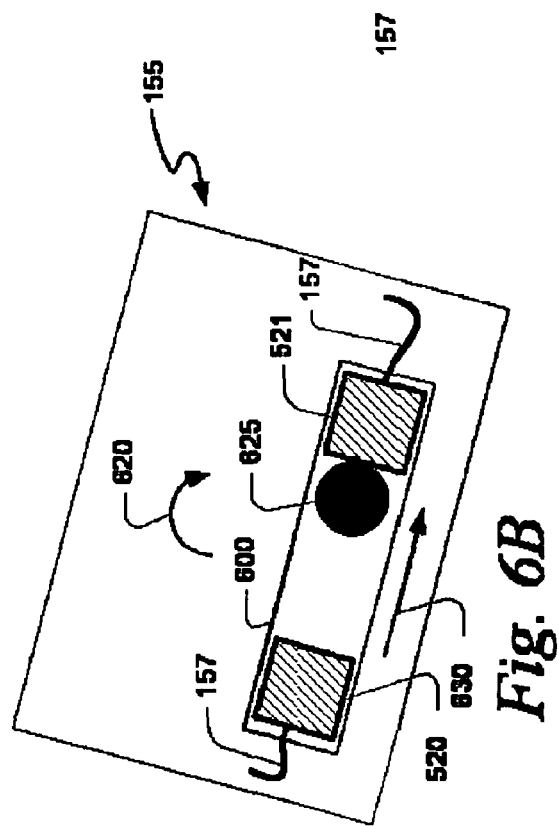

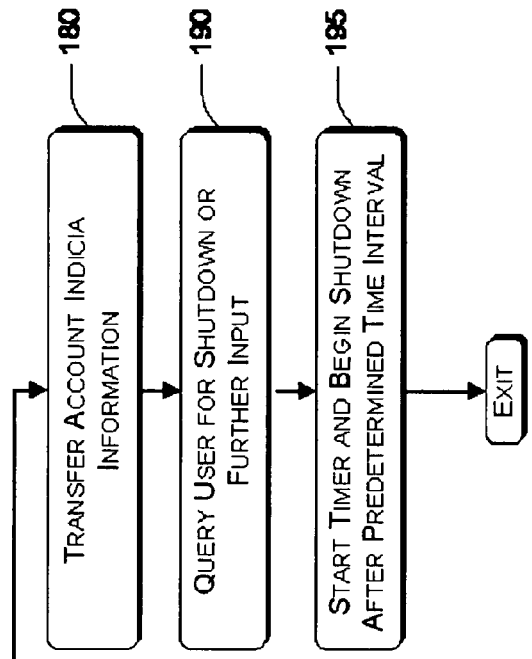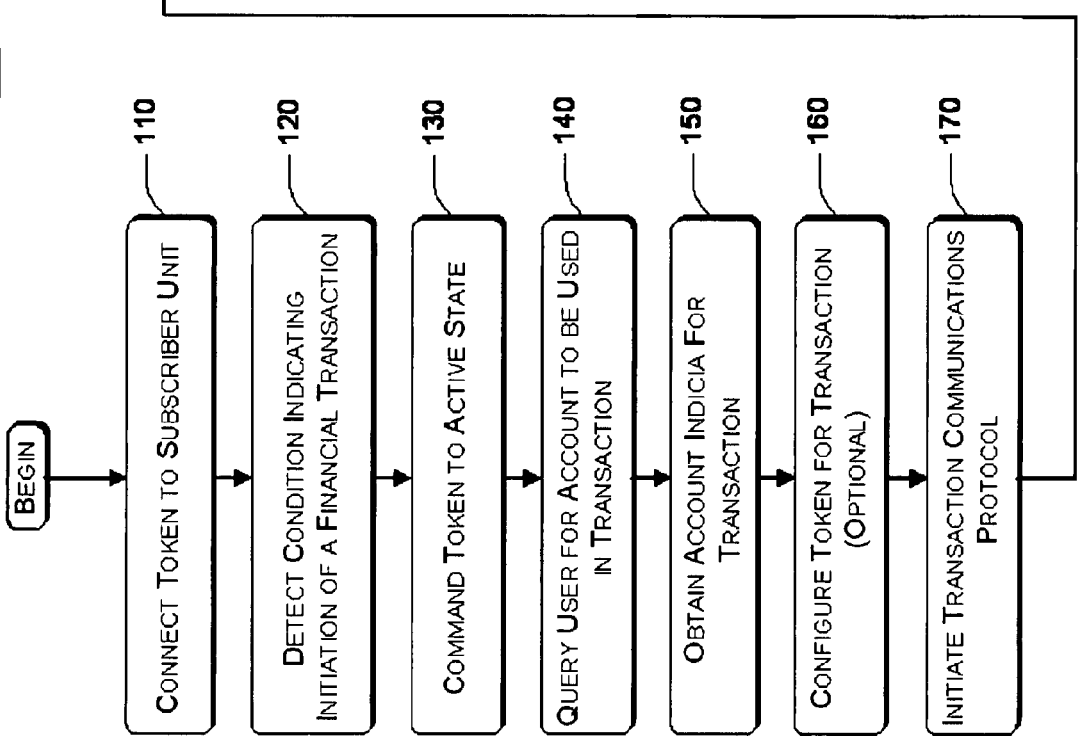

MOBILE SUBSCRIBER DEVICE FOR FINANCIAL TRANSACTION TOKENS

BACKGROUND

Increasingly, consumers have come to rely on debit, credit, and stored value cards as a preferred vehicle to provide payment for transactions. Credit cards provide ready access to funds, offer financial protection superior to cash or checks, support loyalty programs, and allow consumers to take advantage of purchasing opportunities when funds may not be otherwise available. As debit and stored value cards have become increasingly popular, the need for consumers to carry cash or checkbooks is still further reduced.

Within the past few years, card associations and issuers have been providing transaction cards that are enhanced with features beyond the typical embossed account number, expiration date, cardholder name, and signature area. "Smart cards," for example, have now come into popular use, and allow for enhanced security of both debit and credit cards by use of onboard integrated circuits to provide memory and optional microprocessor functionality. Smart cards and other enhanced or memory cards or tokens have found uses from replacements for simple embossed credit/debit cards, toll booth payment, ATM card replacements, and even Subscriber Identity Module (SIM) cards in cellular handsets.

Even though smart cards and electronics-enhanced cards have provided improvements over traditional credit cards, they suffer from a number of deficiencies. For example, electronics circuitry on enhanced financial transaction cards must receive externally-provided power to operate. To obtain power from a merchant's financial or Point-Of-Service (POS) terminal, contact-type smart cards use a physical connector interface; two of such interfaces are defined ISO standards 7810 and 7816. However, many types of cards not in physical contact with a POS terminal or other power source cannot operate, and therefore these cards are necessarily inactive at all other times. Alternatively, some enhanced financial transaction cards obtain power from a terminal-generated RF electromagnetic field by way of an inductor that is part of the card's circuitry. For example, ISO 14443 defines a popular contactless financial transaction card protocol. However, current contactless cards must be in close proximity to the properly modulated electromagnetic field in order to operate (10 cm in the case of ISO 14443-compliant cards). Due to the intentionally limited power and range of such short range fields, RF-powered cards cannot operate outside of the immediate area of a merchant's POS terminal, and may not have sufficient power in some cases to provide sophisticated electronic computations or support more power consuming circuitry such as displays. Further, embedded chips of some contactless smart cards often employ cryptographic security algorithms that can be "cracked" or decoded if the time and electrical current required for certain encryption or decryption operations is measured. Several demonstrations of this mode of account compromise have been documented, and thus, the possibility of surreptitious measurement of such parameters without knowledge of the cardholder presents a significant security risk.

What is needed then is a mobile subscriber unit that interfaces to a financial token or card, wherein the token or card has an energy storage mechanism. What is further needed is a mobile subscriber unit for a financial transaction card or token that has an onboard power source that does not utilize the hazardous chemicals associated with typical power sources such as replaceable or rechargeable batteries. What is also needed is a mobile subscriber unit that utilizes a financial transaction card or token that has a power source that is rechargeable and has a form factor that may be easily carried in a pocket or purse. What is further needed is a mobile subscriber unit for a financial transaction token that can allow the token to operate in an environment significantly removed from a POS terminal. What is also needed is a mobile subscriber unit for a financial transaction token that utilizes an onboard power source to provide cryptographic security and protect the token when not in use. What is still further needed is a mobile subscriber unit that may reprogram a financial transaction card or token to encode a variety of types of account information, thereby allowing for payment flexibility using the financial transaction token. What is also needed is a mobile subscriber unit for a financial transaction token that allows the holder to view information stored in the token without being in proximity to a POS terminal. What is also needed is a mobile subscriber unit for a financial token transaction token that allows the holder to charge an energy storage device on the financial token and view the charge status of the financial tokens' energy source. What is also needed is a mobile communications device that can provide payment for financial transactions though an internally retained financial token.

SUMMARY

There is provided a mobile subscriber unit for a financial transaction token. The financial token has an onboard power storage device that enables the financial token or card that is in communication with the subscriber unit to operate when the card or token is not in the proximity of a merchant terminal (e.g.; a POS terminal). In one implementation, the onboard power storage device includes a rechargeable battery or capacitor such as a thin-film capacitor that stores sufficient energy to power the subscriber unit's onboard electronics and/or the electronics of a financial token in communication with the subscriber unit. The subscriber unit may comprise a consumer device or may be a subcomponent of another consumer device such as a computing device, communications device, an item of clothing, an item of jewelry, a cell phone, a PDA, an identification card, a money holder, a wallet, a purse, a briefcase, or a personal organizer.

In one implementation, the subscriber unit includes a housing with a user interface, an integrated processor and storage, an onboard power source, and an interface to a financial token such as a smart card. The user interface optionally has an exposed region that is provided for encoding data including an account to pay for a transaction. The encoding renders data in several alternate or complementary formats, such as light- or laser-scannable bar coding on a display, electromagnetic signals that are transmitted to a merchant receiver, external contact pads for a contact-based pickup, and a magnetic stripe assembly. Using the exposed area, the subscriber unit may complete a transaction with a merchant as a proxy for a financial token that is in communication with the subscriber unit. In one implementation, a financial token that is in communication with the subscriber unit may be reprogrammed by the subscriber unit by accepting inputs from the subscriber unit's user interface, and a the subscriber unit's integrated processor transmits data to a processor embedded in the token, which in turn accepts the information and executes software in a processor located within the token to effect the reprogramming. This reprogrammable feature enables the holder of the subscriber unit to secure the token by erasing a display or magnetic stripe or locking the token from unauthorized use. The subscriber unit, when access is granted to a user, may perform calculations such as adding a tip from a predetermined tip percentage, or selecting payment to occur from a variety of different financial accounts. In one implementation, a magnetic stripe assembly in proximity to the token is reprogrammable, so that the token's embedded processor may select a particular account from input specified in the subscriber unit's user interface, and provide instructions to reprogram the magnetic stripe. In another implementation, the subscriber unit possesses read/write heads that are capable of reprogramming a financial token as the token is placed within or removed from a retaining cavity within the subscriber unit's housing. The token's magnetic stripe may then be swiped through a conventional merchant magnetic stripe reader to initiate payment for a transaction. In yet another implementation, the account information or transaction authorization protocol stored within a financial token's memory is relayed to a mobile subscriber unit with which it is in communication, and a financial transaction is completed by the subscriber unit in proxy for or in lieu of the token. In another implementation, the token also includes a memory that may optionally be maintained by the onboard power source located within the subscriber unit.

In another implementation, a mobile subscriber unit interfaces to a financial token and provides a charging current to an energy storage device located within the financial token. In this way, a relatively small capacity energy storage element can be recharged by placing the token in communication with the subscriber unit, such as by sliding the token within a slot or cavity within the subscriber unit's housing. An electrical interface may then proceed to charge the financial token's energy storage element through current provided by a power source in the subscriber unit, or through relaying charging current that is obtained by the subscriber unit's external charging interface. In another implementation, the subscriber unit for a financial token possesses a charging circuit that can utilize an onboard energy generation capability to recharge the financial token's energy storage element and optionally recharge the power source within the subscriber unit.

In another implementation, a mobile subscriber unit for a financial transaction card is provided that accepts and retains the card within a protective housing. The card may have a substantially rigid substrate not unlike conventional credit cards and an onboard energy storage device such as a thin-film capacitor. The card includes, in one implementation, a conventional or reprogrammable magnetic stripe assembly that is disposed proximal the substrate. As mentioned previously, the reprogrammable substrate may be configured by a an embedded processor that is commanded through inputs provided to a mobile subscriber unit with which the card is in communication therewith. In one implementation, the user provides input through a keyboard or an array of contact pads or blister buttons on or integrated into the subscriber unit's housing Alternately, the user input section may include a biometric input device that scans fingerprints or other biometric data to authenticate the user of the subscriber unit, or may have a pressure-sensitive area for inputting a predetermined access glyph such as by the user dragging a fingertip over a pad to reproduce a symbol that the user has previously identified. In one embodiment, the housing of the subscriber unit retains and protects the card from unauthorized access, such as by preventing physical access to the card through a locking retaining mechanism, and/or by providing shielding against electromagnetic radiation including RF signals.

Various features and advantages of the invention can be more fully appreciated with reference to the detailed description and accompanying drawings that follow.

DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 5A-5B show illustrations of a pendulum and piezoelectric crystal implementation of the charging circuit seen in FIG. 1;

FIGS. 6A-6C show illustrations of a movable mass and piezoelectric crystal implementations of the charging circuit seen in FIG. 1; FIG. 9 illustrates an exemplary process for the use of various implementations of a mobile subscriber unit and financial transaction token such as the mobile subscriber unit seen in FIG. 1 or the financial card.

DETAILED DESCRIPTION

Figure 1:
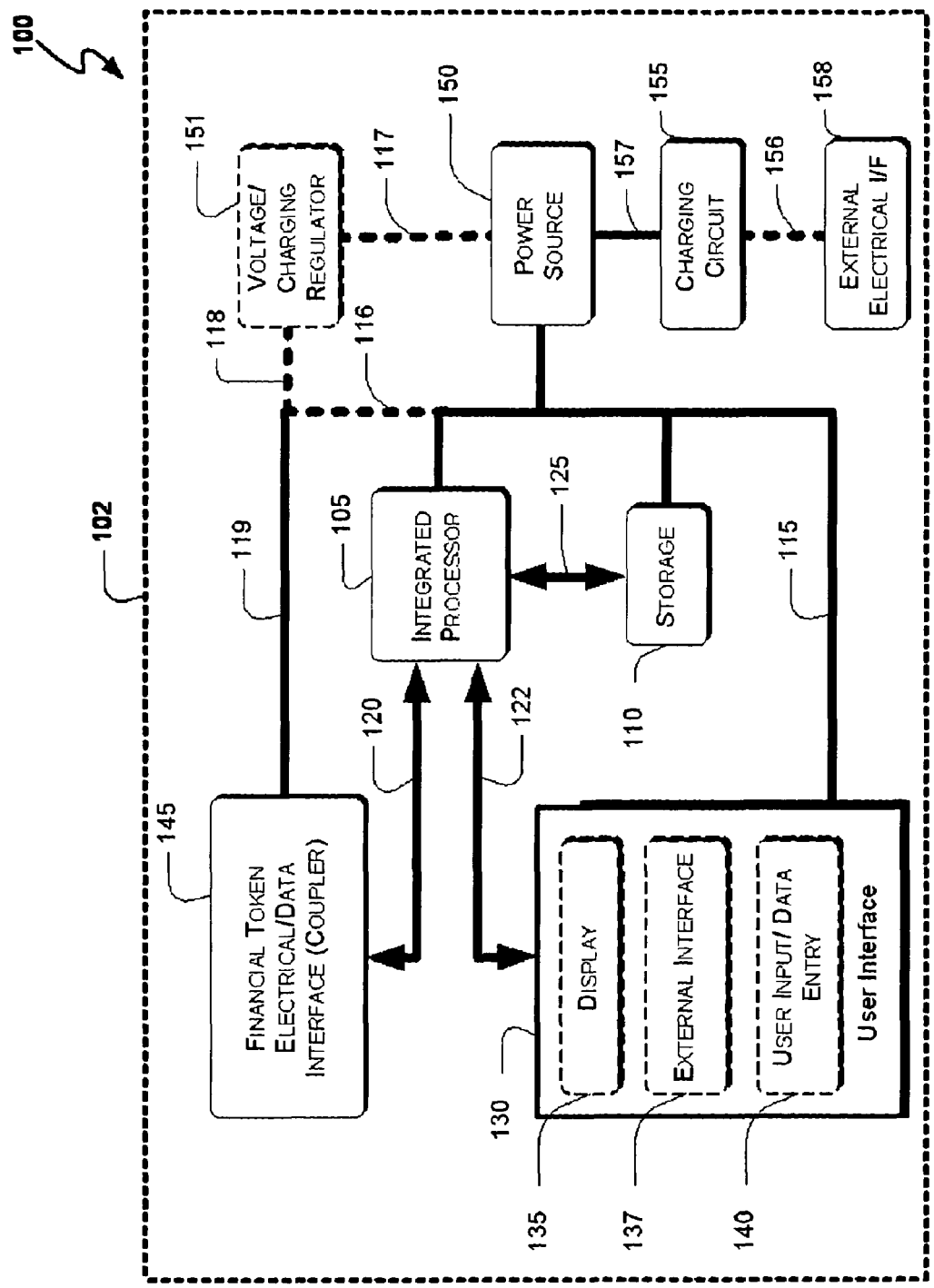
FIG. 1 depicts a block diagram of an exemplary implementation of a mobile subscriber unit for a financial transaction token including an electrical/data interface.

A block diagram for an exemplary implementation of a mobile subscriber unit 100 for a financial transaction token is seen FIG. 1. The subscriber unit 100 comprises an assembly 102 that houses, supports, and/or integrates the components shown in FIG. 1. Those of skill in the relevant arts understand that the assembly 102 may be integrated within a consumer product such as a cell phone or PDA (with embodiments shown in FIGS. 7 and 8, respectively), or may comprise a stand-alone assembly. The subscriber unit includes an integrated processor 105, which those of skill in the relevant arts will appreciate may comprise a microprocessor chip, a microcontroller chip, an ASIC, a digital signal processor (DSP), or a smart card chip. The processor 105 is coupled to a power circuit 115. The power circuit 115 provides power to the subscriber unit's electronic components 105, 110, and 130, and may further include signals indicating charging or connection status. The processor 105 is further coupled to signal busses 120, 122, and 125, which those of skill in the relevant arts will recognize may be comprised of a plurality of individual dedicated signal circuits, commonly shared signal busses, bidirectional signal circuits, unidirectional signal circuits, or combinations thereof. In one implementation, signal busses 120, 122, and 125 comprise a single commonly shared address/data bus with associated control signals. The integrated processor 105 is coupled to a storage 110 through signal bus 125. Those of skill in the relevant arts appreciate that the storage 110 may comprise any number of electronic, magnetic, or electromechanical storage devices such as miniature hard drives; SRAM memory; DRAM memory; ROM, PROM, EEPROM, or flash memory; or combinations thereof, and such storage may be included in total or in part upon the same integrated circuit substrate as the processor 105. The storage 110, if of volatile type, may have its data values preserved by power provided by the connected power circuit 115. Data stored in memory 110 may include code or program instructions which, when executed by processor 105, performs at least part of a command sequence requested by a user through the user interface 130.

An onboard power source 150 is coupled to and energizes the power circuit 115. Those of skill in the relevant arts will recognize that energy storage devices such as batteries, inductors, capacitors, or combinations thereof may be utilized to implement the power source 150. In one implementation, power source 150 comprises a thin film capacitor, and may utilize a single dielectric or a multilayer configuration alternating conducting layers and dielectric layers. A number of dielectrics such as polyester; polypropylene; polycarbonate; polystyrene; polyimide; polyfunctional acrylics; amorphous hydrogenated carbon; polytetrafluoroethylene; polyxylylene, nitrides of silicon and aluminum, PTFE, PET, and combinations thereof may be utilized in such thin film capacitor implementations. A substantially planar thin film capacitor implementation is beneficial for implementation in the instant subscriber unit device 102, as the substantially planar form factor may be useful in minimizing the overall size of the subscriber unit's footprint. In another implementation, power source 150 may be implemented with any number of conventional rechargeable and non-rechargeable batteries such as alkaline batteries, lithium ion batteries, nickel-cadmium batteries, and nickel metal hydride batteries.

The power source 150 also provides current to a power line 119 of a financial token interface (or coupler) 145 either directly through a connection 116 coupled to the power circuit 115, or via output 118 from a voltage regulator 151 which receives power from a coupling 117 to the power source. Those of skill in the relevant arts appreciate that the regulator 151 may be implemented with any number of conventional voltage regulators; for example, but not by way of limitation, such regulators may include alone or in combination: zener diodes, voltage regulator circuits, voltage translators, transformers, voltage dividers, switched power supplies, silicon controlled rectifiers, triacs, potentiometers, and the like.

The power source 150 is coupled 157 to a charging circuit 155. The charging circuit may also be coupled 156 to an external electrical or charging interface 158. Those of skill in the relevant arts will readily recognize that the charging interface 158 may be implemented with electrical contacts to an external circuit, or via an inductor for receiving power via electromagnetic radiation, and may comprise additional signals for conveying data to the processor 105. In one implementation, charging circuit 155 includes one or more photovoltaic cells, coupled to the power source, which produce electricity upon exposure to light. In another implementation, charging circuit 155 further includes one or more piezoelectric crystals electrically connected, via coupling 157, to the power source 150, and a movable mass that strikes the piezoelectric crystals as the subscriber unit 100 is moved. Turning to FIG. 5A, a piezoelectric charger implementation of the charging circuit 155 is shown. A movable pendulum mass 500 rotates 505, preferably in a substantially planar motion, about a pinned end 510. The pendulum mass 500 also has an impact end 525, that is disposed between and may strike either of two piezoelectric crystals 520, 521. As the crystals 520, 521 are electrically coupled 157 to the energy storage device 150, impacts of the pendulum mass 500 cause pulses of current to be delivered to the energy storage device 150 thus charging the storage device 150. FIG. 5B provides an illustration of the pendulum 500 moving 506 to strike crystal 521, and likewise, the pendulum mass 500 may move the opposite direction to strike the other crystal 520. Turning to FIG. 6A, an alternate mass/piezoelectric implementation of the charging circuit 155 is shown in cross section. A charger housing 600 constrains piezoelectric crystals 520, 521 from movement, and crystals 520, 521 are electrically coupled 157 to the power source 150. A movable mass 625 is disposed between the crystals 520, 521 within in the charger housing 600, and the mass is free to move within the spaces defined 610 by the charger housing 600 and the crystals 520, 521 as the appliance 100 is moved. Those of skill in the relevant arts understand that charger housing 600 may be implemented by many geometrical shapes that constrain the piezoelectric crystals 520, 521 while allowing mass 625 to move in the available space 610. For example, but not by way of limitation, charger housing 600 may be a cylindrical tube with mass 625 comprising a dense spherically-shaped object such as a metal ball bearing or a dense cylindrical metal slug. Similarly to FIGS. 5A-B, as the mass 625 strikes crystals 520, 521, pulses of current are produced and charge the power source 150. An example of the charging circuit of FIG. 6A is shown in action in FIG. 6B. When the subscriber unit 102 containing charging circuit 155 is tilted 620 with respect to ground horizontal, the force of gravity propels mass 625 toward 630 one of the piezoelectric crystals 521, whereupon the mass 625 strikes the crystal 521 producing a current which is electrically coupled 157 to the power source 150. Turning to FIG. 6C, another implementation of a charging circuit 155 is shown with two crystal/mass housings 600, 650. In this illustration, housings 600, 650 have been laid out in the charging circuit 155 with central axes oriented orthogonally with respect to each other. Similarly to FIGS. 5A and 5B, a mass 675 is also movably disposed between two piezoelectric crystal elements 660, 661, that are coupled 157 to the power source 150, and the mass 675 is constrained by the housing 650. With this arrangement, rotation of the subscriber unit 100 with respect to horizontal produces alternate mass/crystal strikes between the vertically disposed housing 650 and the horizontally disposed housing 600. Those of skill in the relevant arts appreciate that any number of crystal/mass/housing assemblies may be included in the charging circuit 155, and many possible geometric alignments are possible beyond disposal along orthogonal central axes. Those of skill in the relevant arts also appreciate that inertia of the mass 625, 675 may be used to cause striking forces as the charging circuit 155 is moved, independently from tilting the device. Therefore, movements such as walking or riding a vehicle may provide sufficient physical displacement to cause charging of the power source 150 to occur.

Returning to FIG. 1, a user interface 130 is also provided, and is coupled to the power circuit 115 and to the integrated processor 105 via signal bus 122. In one implementation, the user interface may include one or more conventional displays 135 that may output text, graphics, or a combination. The display 135 may be implemented in such formats as a liquid crystal display, a thin film transistor display, touch-sensitive screen, or organic LED display. The user interface 130 also includes an optional data entry apparatus 140. In one implementation, the data entry apparatus 140 may include an array of buttons labeled in a manner such as a QWERTY keyboard, a touch pad, a touch screen, or in a more simplistic implementation, a telephone touch pad with alphanumeric key assignments. In one implementation, the buttons in the data entry apparatus 140 may comprise blister buttons commonly known in the art. The user interface 130 may also include an optional on/off button that activates the subscriber unit 100 for selecting desired account access, performing a calculation, or authenticating a user.

An external interface 137 is also provided. The external interface 137 enables the subscriber unit 100 to communicate with external devices such as computer terminals, computer networks, or point of sale (POS) terminals. The interface 137 receives data and/or commands for displaying text or graphical information from bus 122, and receives power from power circuit 115. The interface 137 may also receive data from an outside source such as a wireless POS terminal, a financial institution, or a personal computer, and relays the data to the integrated processor 105 through data bus 122. Through user input to the data entry device 140, a variety of data may be provided to the external interface. In one implementation, the information provided to be output from the interface 137 may comprise health care information, personal identity information, biometric data, music, video data, or a combination thereof, and is considered interchangeable with the term "account data" used herein.

Figure 2:
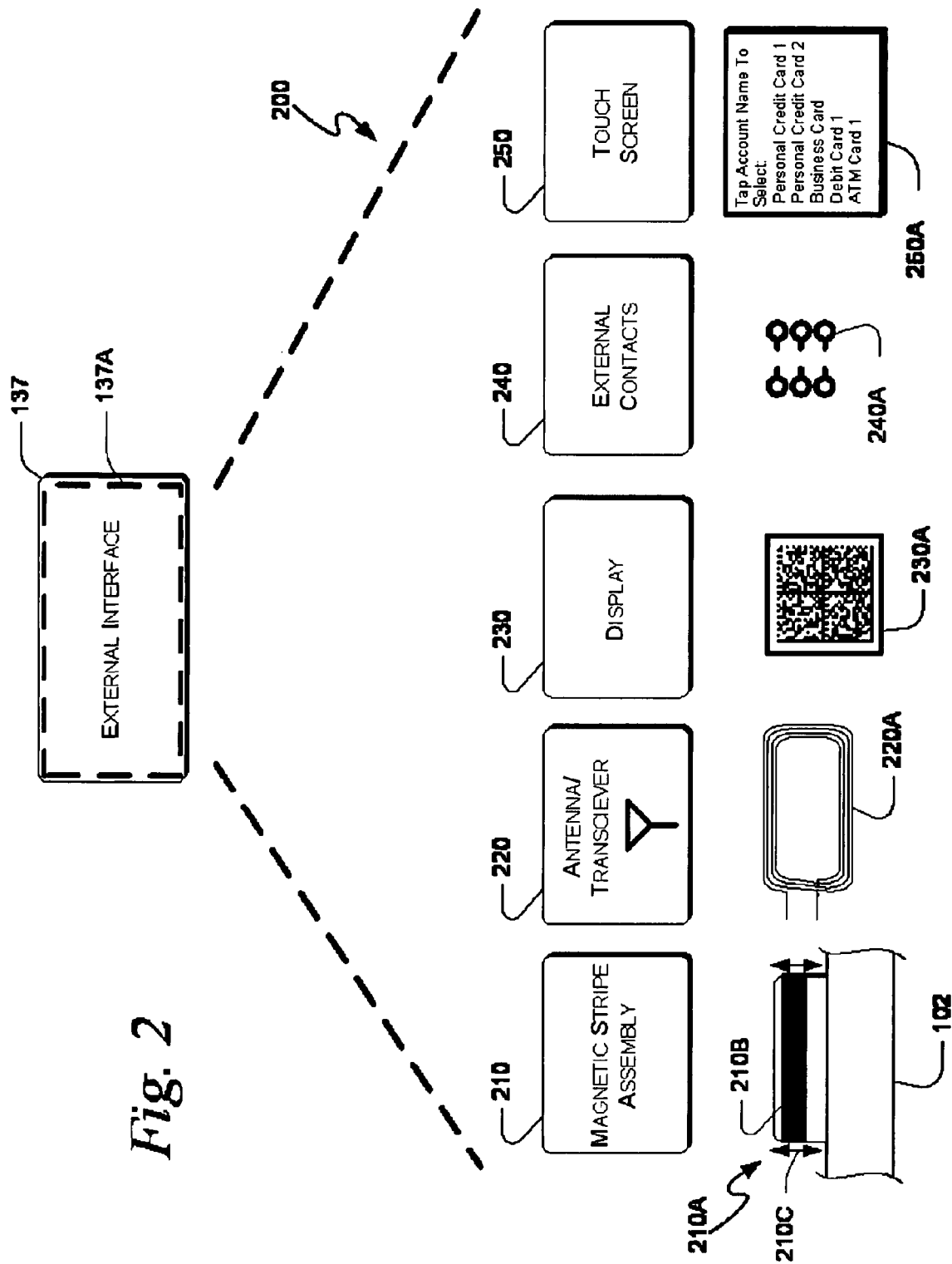
FIG. 2 illustrates possible alternate implementations of the electrical/data interface seen in FIG. 1.

Turning to FIG. 2, exemplary implementations 200 of the external interface 137 are shown. External interface 137 is depicted with an optional shielding element 137A, which allows desired electromagnetic, optical, or radiative signals to penetrate while protecting the external interface 137 from physical abuse or damage. The subscriber unit 100 may optionally have areas outside of the external interface 137 shielded from physical abuse or otherwise acceptable forms of electromagnetic radiation. Some of the acceptable signals that are allowed to penetrate the shielding 137A may include, but are not limited to, signals accompanying a magnetic field, RFID signals, IrDA signals, visible light, invisible light, modulated laser, and/or modulated RF communication signals. By way of example and not by way of limitation, selective shielding element 137A may comprise a clear plastic shield, conformal coatings, an opaque plastic shield, or a clear thin film, depending on the implementation of external interface 137.

Non-limiting examples of the external interface are shown at reference numeral 200, and include a magnetic stripe assembly 210, an antenna and/or transceiver 220, a display screen 230, electrical contacts 240, and a touch screen 250. The magnetic stripe assembly 210 may comprise, in one implementation 210A, a reprogrammable magnetic stripe 210B that accepts data and/or commands from the processor 105 and formats and renders that data into a form on a magnetic stripe that is readable by conventional merchant magnetic stripe-reading POS terminals. Through this approach, the processor 105 may configure itself with a particular account for use in a transaction as a function of user input selecting the account. Alternatively, the processor 105 may erase the magnetic stripe of the assembly 210, rendering the card useless in the event of its loss or theft. In the implementation shown 210A, the magnetic stripe assembly 210B at least partially slidably moves 210C into and out of the housing 102 of the subscriber unit 100 (partial view shown, see also FIG. 7 and FIG. 8), allowing the subscriber unit 100 to conduct a financial transaction at a point of sale terminal that includes a magnetic stripe reader.

Continuing with FIG. 2, another implementation of the external interface 137 is shown as an antenna and/or transceiver 220. The antenna 220 may include commonly used loop inductors such as the one shown 220A, cellular phone antennae, WiFi antennae or in those shown in related ISO standards for RF-readable smart cards. With such an interface, account data may be translated, modulated, transmitted, and received by the subscriber unit in a manner acceptable by an RF contactless merchant Point-Of-Service (POS) terminal, a 802.11 WiFi or WiMax network, or by a cellular or RF communications network.

The external interface 137 may also be represented with a display screen 230. Account data may be rendered in the form of an optically-readable area, such as a one dimensional or two dimensional bar code 230A. In this manner, merchant POS terminals may optically scan the display area 230 with conventional laser scanners, and obtain account information without the need for expensive contactless RF POS terminals. As the display is electronically reconfigurable with information provided by the processor 105, the subscriber unit 100 may represent any number of accounts for transaction payment based on the user's preference and input to the user interface 130. Also, as a security feature, the display may be blanked or filled with a decorative or entertaining graphic when the user has not provided an optional security access code, pad stroke, or pin number to the user interface 130.

External contacts 240 are yet another alternative implementation of the external interface 137 shown in FIG. 2. With the subscriber unit 100 possessing physical contacts such as an array of conductive pads or shapes 240A, the subscriber unit may be placed in physical contact with a merchant POS terminal, and the external contacts 240 may establish connectivity to the merchant's financial processing system. The integrated processor 105 may relay account-related information to the merchant POS terminal through the contact interface, thereby allowing the subscriber unit 100 to be utilized with the large number of preexisting merchant POS terminals that accept smart cards. As with the other implementations 210, 220, 230, and 250 of the external interface 137, a combination of techniques may be utilized within the external interface to provide flexibility of use and ease of merchant access to account information.

Alternatively, the external interface 137 may comprise a touch screen 250, wherein text and/or graphics may be displayed, and user input may be accepted by touching selected areas of the screen. For example, but not by way of limitation, in an implementation shown at reference numeral 250A, a user is prompted to tap on one of a plurality of account descriptors, thereby selecting an account to complete a transaction. Those of skill in the relevant arts also appreciate that tapping the screen may be combined with using pointing devices such as a joystick, direction buttons, or selection wheels. In one embodiment, a user may provide authentication information by touching the display 250 in specified areas to indicate sequences of pin numbers, selected graphical elements, or drag strokes that match a predetermined access criterion stored within the storage 110.

Figure 3:
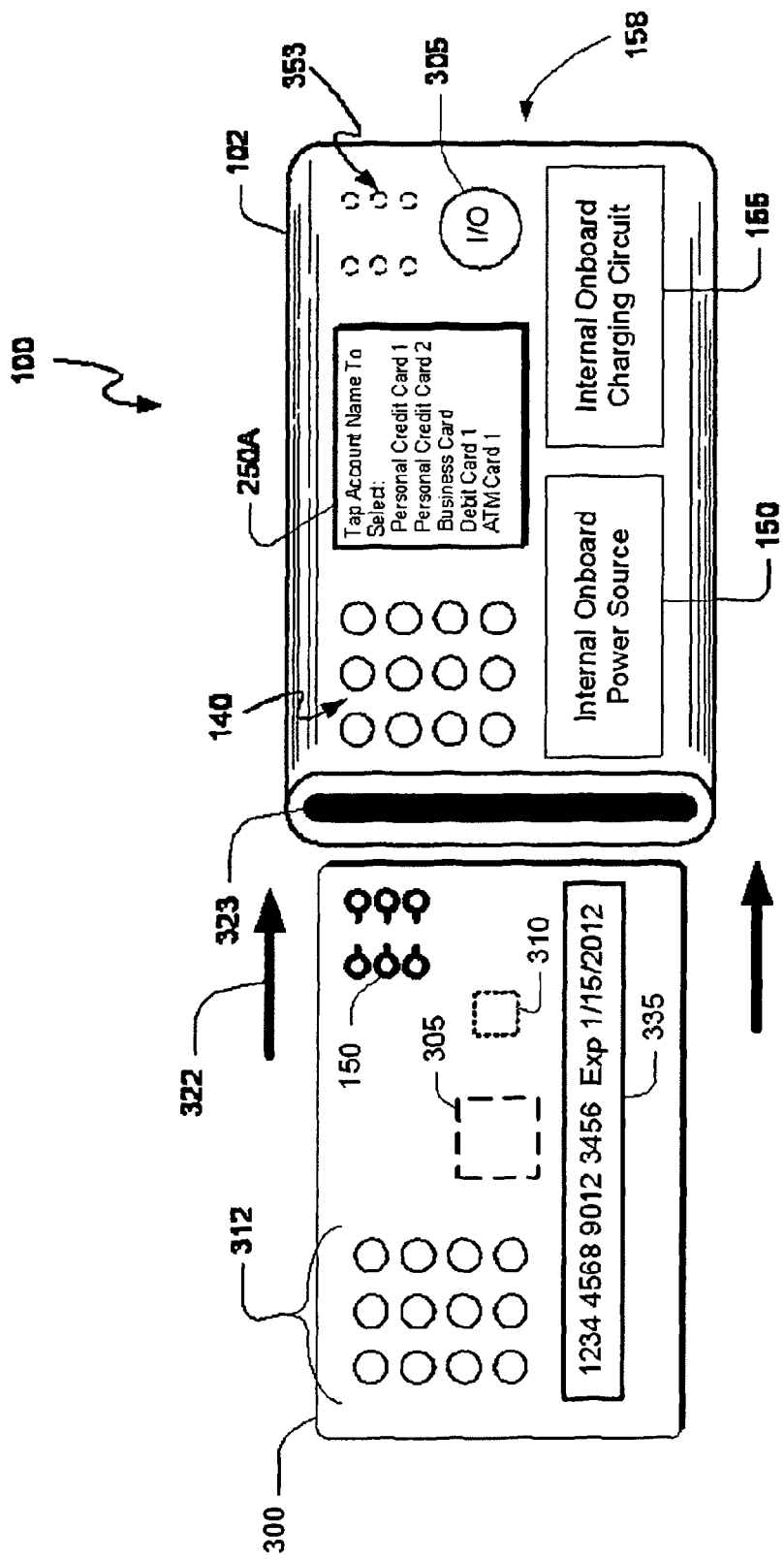
FIG. 3 shows an exemplary implementation of a financial token and a mobile subscriber unit for a financial transaction token.

Turning to FIG. 3, an implementation of the subscriber unit 100 is shown along with one possible financial token embodiment 300. The substrate of the financial token 300, in one implementation, takes the form of a transaction card 300 that is substantially rigid and thin as are conventional credit or debit cards, and possesses substantially similar dimensions as existing credit, debit, stored value, or smart cards. In one implementation, the thickness of card 300 exceeds that of conventional credit, debit, or stored value cards in order to accommodate circuitry, electronics, displays, and/or interface elements. The substrate of the card 300 contains an embedded processor 305 and memory 310.

A front side of the token 300 is shown with an array of buttons 312 and a display 335 for outputting alphanumeric text or graphics, such as an account number and expiration date. An array of physical contacts 350 is shown, which may be utilized in conjunction with a POS terminal, or the electrical/data interface or coupler 145. In the illustrated implementation, the token 300 may be placed within the subscriber unit 100 by, for example, but not by way of limitation, sliding the token 300 into 322 a slot 323 defining a cavity within the subscriber unit housing 102. The subscriber unit housing 102 retains the token 300 until the user actuates a hardware mechanism such as a latch (not shown) that retains the token 300 within the cavity within the subscriber unit housing 102. Alternatively, the token 300 could be retained by an electromechanical latch (not shown) coupled to the power source 150 and the integrated processor 105, wherein the token could be released upon an execution of a command by the processor 105. For example, but not by way of limitation, if a user entered a valid authorization code into the touch screen interface 250A, the processor determines the code is valid and provides a command to the electromechanical latch to release the token from the subscriber unit. Alternatively, a drive element (such as those that actuate Compact Disk player disk slots in portable CD players) could eject the card through the slot 323 upon receiving a command to eject the card from the processor 105.

The subscriber unit 100 is shown with a user input mechanism comprising an array of buttons 140, and a touch screen 250A as described in relation to FIG. 2. An external charging interface 158 is provided on a side panel of the housing of the apparatus 102. The touch screen, as with most conventional Portable Digital Assistants (PDAs), both accepts input through strokes or taps and produces output for viewing by the user. Status information and commands may be entered by the user tapping on or dragging on the touch screen 250A.

By way of example but not limitation, the subscriber unit 100 includes, in the illustrated embodiment, an array of electrical contacts 353 comprising at least a portion of the financial token internal electrical interface 145. When the token 300 is fully inserted 322 into the cavity of the subscriber unit housing 102, the contacts 353 proximally engage with the contacts 350 on the token 300, thereby establishing electrical connectivity. As described below other implementations of the internal interface 145 with the token 300 are possible, whereby electrical coupling between the token 300 and the subscriber unit 100 are accomplished using all or partially contactless approaches. Further, as recited herein, the terms "coupling" or "in communication with" may be interpreted to mean a physical connection, a wireless connection, or some combination of physical and wireless connectivity.

In one implementation, the user turns on the subscriber unit 100 by depressing an on/off button 305, and then produces a stroke on the pad/screen 250A by dragging a fingertip or stylus across the pad or screen area 250A to reproduce a symbol or glyph substantially similar to a symbol pre-programmed into the integrated processor 105 and storage 110 (embedded, not shown). Once the symbol or glyph is entered by the user on the pad/screen 250A, the processor 105 compares its features with a pre-stored graphical implementation and if the symbol's features are within a predetermined range, the subscriber unit 100 is enabled for use, otherwise an invalid entry message is output to display 250A and use is further inhibited until the successful glyph or symbol is entered.

As further explanation of the coupling between the subscriber unit 100 and the token 300, we return to FIG. 1. The subscriber unit 100 includes an internal electrical/data port or interface 145 that is coupled to the integrated processor 105 through the signal bus 120 and to a power signal through power line 119 as described above. Since the signal bus 120 and power line 119 carry potentially bidirectional signals, data and/or power signals may flow into or out of the electrical/data interface 145. In one implementation, a power signal is delivered to and energizes at least part of the coupled financial token 300 through the electrical data interface 145. Using the supplied power, the financial token 300 may operate onboard circuitry to exchange data with the subscriber unit 100, receive commands from the subscriber unit 100, or charge an energy storage element embedded within the financial token 300 from the subscriber unit's power source 150. Through the interface, the integrated processor 105 may also determine a charge state of the energy storage element within the token, and display the status in the user interface 130. Also, memory 310 within the financial token 300 may be queried through commands issued by the bus 120 through the interface 145, and the processor 105 may receive and process the results of the data returned through the interface 145. For example, but not by way of limitation, the processor 105 may request data regarding a financial account from the financial token 300, and the subscriber unit 100 may conduct a transaction using the external interface 137, in lieu of conducting the transaction using only the financial token 300. As another example, but not by way of limitation, the processor 105 may send commands and account data to the financial token 300, configuring the token 300 for use for a particular account as selected through the user interface 130.

The internal port or interface 145 may be coupled to a financial token 300 by any number of electrical coupling techniques, including electrical contacts between the subscriber unit 100 and the financial token, RFID signal transceivers, IrDA signal infrared transceivers, visible light transceivers, invisible light transceivers, magnetic strip read/write heads, modulated laser transceivers, modulated RF communication transceivers, and combinations thereof. Those of skill in the relevant arts appreciate that a combination of coupling techniques may be utilized, such as by providing a data signals through electrical contacts while a power signal is delivered by an electromagnetic field from the subscriber unit 100 to an inductor located within the token 300.

Figure 4:
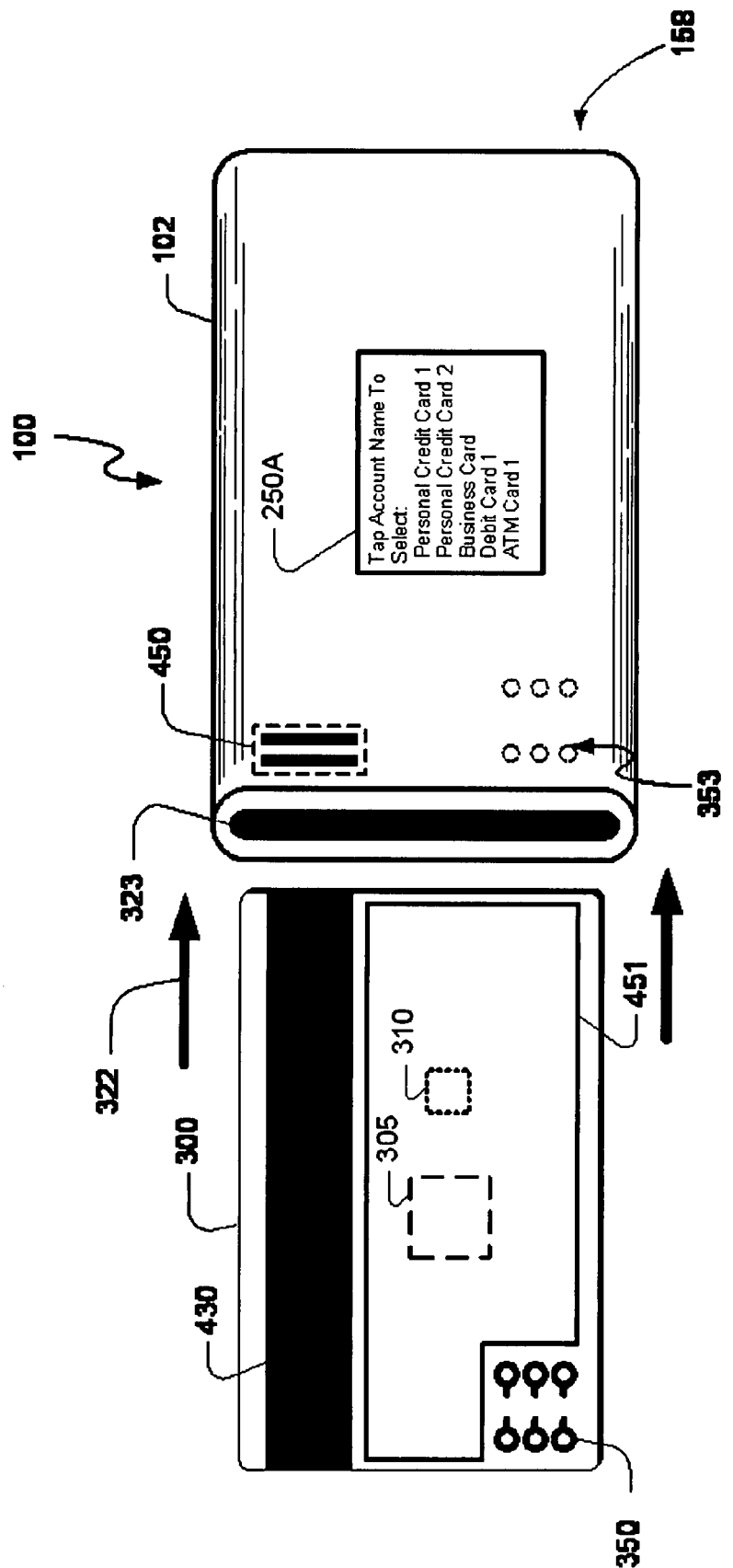
FIG. 4 shows a second exemplary implementation of a financial token and a mobile subscriber unit for a financial transaction token.

Turning to FIG. 4, another implementation of a mobile subscriber unit 100 is shown with a financial token 300. The token 300 has an embedded processor 305, a memory 310, and an energy storage element 451 such as a thin film capacitor electrically coupled to the token's electronic circuitry. The token 300 has a magnetic stripe 430, which like conventional magnetic stripe fields, is readable by preexisting merchant POS terminals or ATMs. The magnetic stripe 330 may optionally be programmable by data and commands sent from the an embedded processor within the token 305 and memory 310.

Similarly to FIG. 3, the token 300 may be placed within the subscriber unit 100 by, for example, but not by way of limitation, sliding 322 the token 300 into a slot 323 defining a cavity within the subscriber unit housing 102. The subscriber unit housing 102 retains the token 300 until the user actuates a hardware mechanism such as a latch (not shown) that retains the token 300 within the cavity within the subscriber unit housing 102. Alternatively, the token 300 could be retained by an electromechanical latch (not shown) coupled to the power source 150 and the integrated processor 105, wherein the token could be released upon an execution of a command by the processor 105. For example, but not by way of limitation, if a user entered a valid authorization code into the touch screen interface 250A, the processor determines the code is valid and provides a command to the electromechanical latch to release the token from the subscriber unit. Alternatively, a drive element (such as those that actuate Compact Disk player disk slots in portable CD players) could eject the card through the slot 323 upon receiving a command to eject the card from the processor 105.

In this implementation, the subscriber unit 100 includes an internal set of electromagnetic read and/or write heads 450 which comprise one possible embodiment of the electrical/data interface 145. As the token 300 is moved 322 into the cavity 323, the heads 450 traverse a significant portion of the length of the magnetic stripe 430 while in proximity to the surface of the magnetic stripe. If the heads 450 are so enabled by the integrated processor 105, data may be read from and/or written to the magnetic stripe 430 during insertion 322 or extraction of the token 300. Such data, as mentioned previously is processed by the integrated processor 105 by transmitting the data to or receiving the data from the data bus 120 which is in turn coupled to the internal interface 145. In one example, but not by way of limitation, the token's magnetic stripe 430 is erased by the read/write heads 430 upon insertion 322 to the subscriber unit 100, and is programmed with account data specified in the user interface 140 upon removal of the token 300 from the subscriber unit.

Also shown on the card 300 is an optional array of physical contacts 350, which, as described above come into proximity with internal electrical contacts 353 when the token 300 is inserted 322 into the cavity 323. The contacts 353 comprise at least a portion of the financial token internal interface 145. When the token 300 is fully inserted 322 into the cavity of the subscriber unit housing 102, the contacts 353 proximally engage with the contacts 350 on the token 300, thereby establishing electrical connectivity. As mentioned previously, other implementations of the internal interface 145 with the token 300 are possible, whereby electrical coupling between the token 300 and the subscriber unit 100 are accomplished using all or partially contactless approaches.

Figure 7:
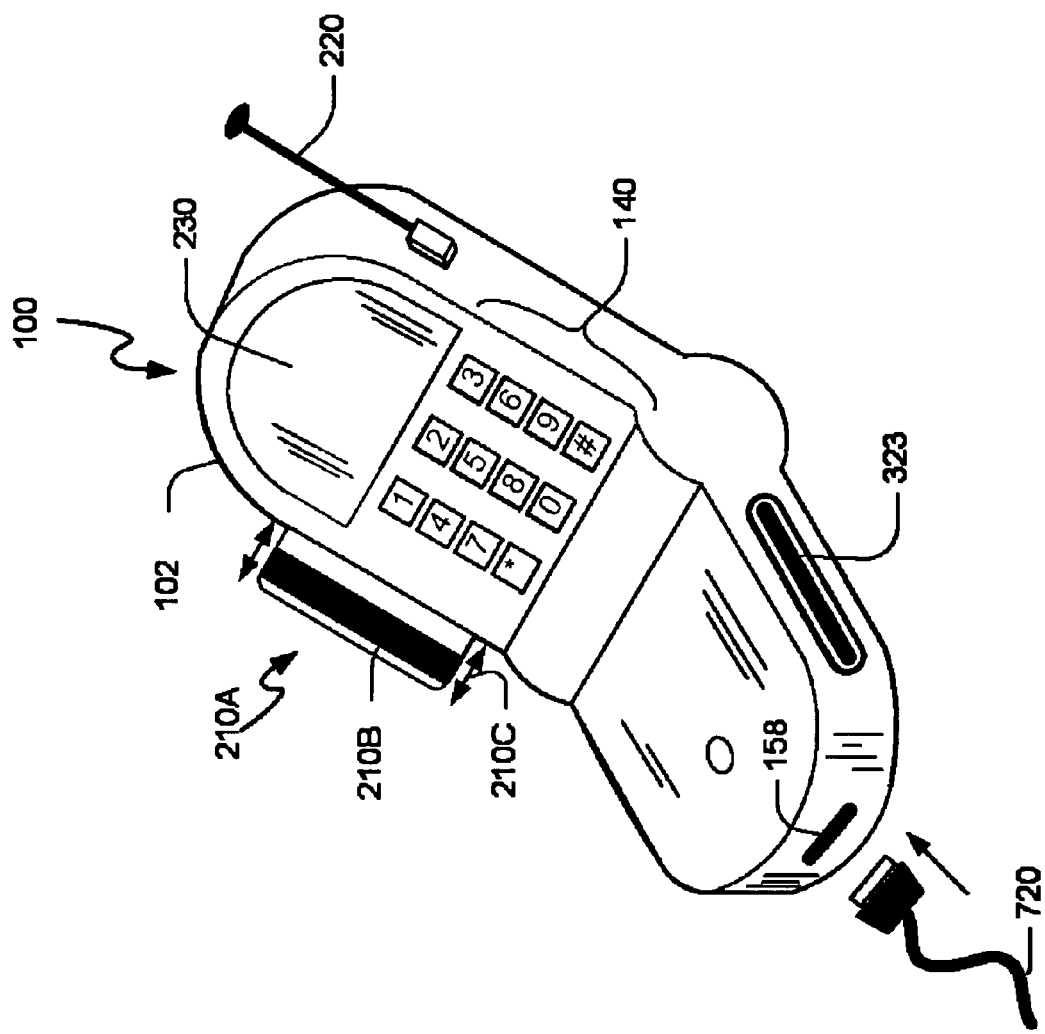
FIGS. 7-8 illustrates two additional exemplary embodiments for the subscriber unit for a financial transaction token.
Figure 8:
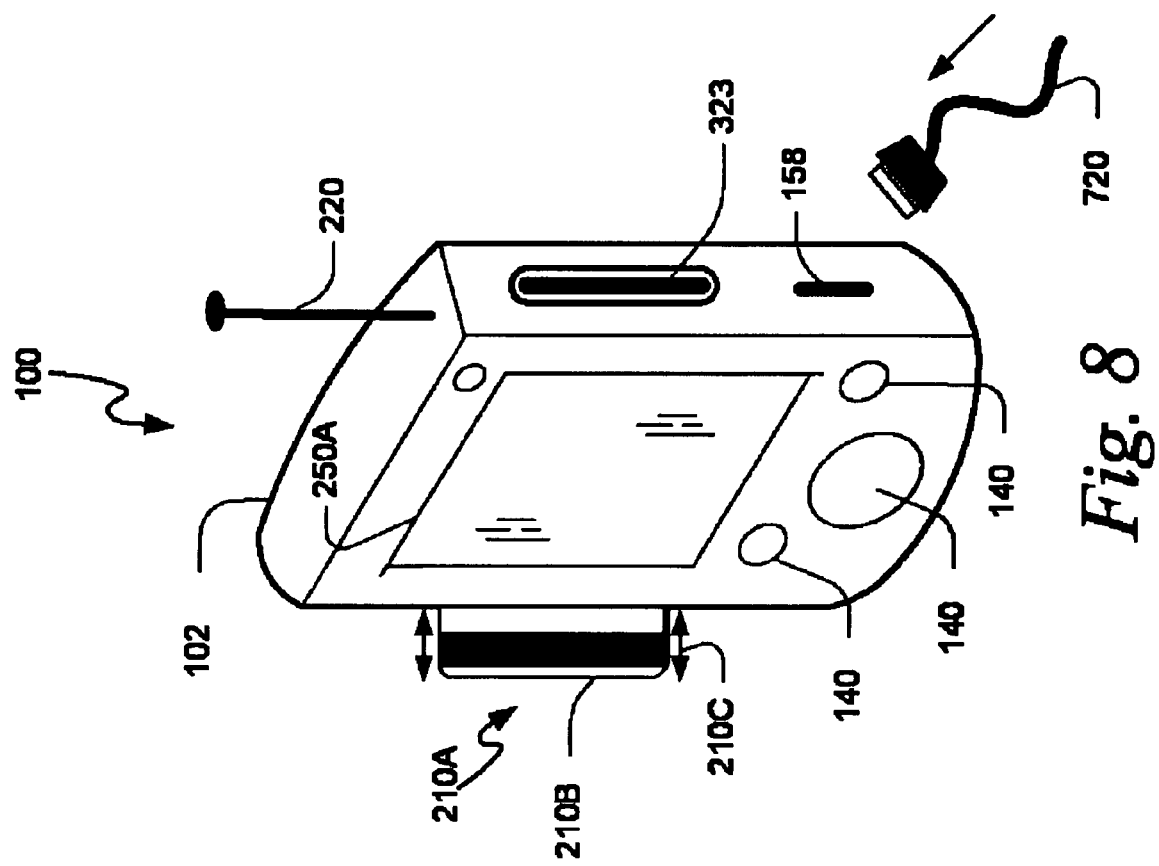

Turning to FIG. 7, an alternate implementation of the subscriber unit 100 is shown as a communications device such as a portable cellular telephone. The subscriber unit housing 102 includes a slot 323 for a financial token 300, or optionally, the financial token 300 is permanently or semi-permanently integrated within the hardware of the subscriber unit 100. The subscriber unit 100 has a display 230, an antenna 220 coupled to an internal transceiver, and a data entry keypad 140, allowing interaction with the subscriber unit to issue user commands. In one embodiment, the external electrical interface 158 is configured to receive a contact plug bearing electrical signals from a component such as a cable 720, and such signals may comprise charging signals and/or data signals. As mentioned previously, the subscriber unit 100 may be used to complete a financial transaction without removing token 300, or the subscriber unit 100 may configure the token 300, using commands entered through the user interface 140, to select a particular transaction payment account to be transmitted to the token through the internal electrical interface (not shown). In a similar spirit, FIG. 8 illustrates another implementation of the subscriber unit 100, shown as a consumer device such as a personal digital assistant (PDA). The subscriber unit housing 102 includes a slot 323 for a financial token 300, or optionally, the financial token 300 is permanently or semi-permanently integrated within the hardware of the subscriber unit 100. The subscriber unit 100 has a touch screen display 250A for entry and output of commands and data, data buttons and pads 140, and an antenna 220 coupled to a transceiver within the housing 102. The electrical interface 158 is configured to receive a contact plug bearing electrical signals from a component such as a cable 720, and such signals may comprise charging signals and/or data signals. As mentioned above, the subscriber unit 100 may also be used to complete a financial transaction without removing token 300, or the subscriber unit 100 may configure the token 300, using commands entered through the user interface 140, to select a particular transaction payment account to be transmitted to the token through the internal electrical interface (not shown).

FIG. 9 illustrates an exemplary process 900 for the use of various implementations of a mobile subscriber unit and financial transaction token such as the mobile subscriber unit 100 seen in FIG. 1 or the financial card 300. In step 910 the financial transaction token or card 300 is connected to the subscriber unit, such as by (see, e.g., FIG. 4) sliding 322 a financial card 300, into a slot 323. This is an optional step which may have been performed by a party selling a turnkey product such as a mobile cellular phone with an integrated financial token or card. Next, the processor 105 of the mobile subscriber unit 100 detects a condition 920, wherein payment for a financial transaction is pending. Non-limiting examples of such conditions indicating the need to provide payment for a transaction include, but are not limited to a user entering an indicia through the user interface such as an indicia indicating a request to provide payment for a financial transaction; a user pressing a button in the user interface 130 while the mobile subscriber unit is in an active communication mode; a user selecting the purchase of a service from a solicitation presented in the user interface 130; a user placing the mobile subscriber unit 100 within a predetermined distance of a wireless point of sale (POS) terminal; a user placing the mobile subscriber unit 100 within an electromagnetic field where the electromagnetic field has a predetermined communications protocol and a minimum magnitude (such as in the case of the antenna/transceiver 220 detecting RF signals broadcast by a merchant that are intended to interface to financial transaction devices); a user placing the mobile subscriber unit 100 in contact with electrical contacts coupled to a POS terminal; the mobile subscriber unit 100 detecting, through the antenna/transceiver 220, an authenticated signal requesting initiation of a transaction; the integrated processor 105 of the mobile subscriber unit detecting a request to initiate a transaction provided by the financial token or card 300 through the electrical interface 145; and combinations of these conditions.

In step 930, the integrated processor 105 of the mobile subscriber unit 100 sends a command to the token or card 300 through the interface 145. This command may include, but not by way of limitation, a command to transition from a standby state to an active state. If so activated, the token or card 300 may then be capable of obtaining data from a memory 310 within the token or card 300 and transmitting the data to the integrated processor 105 through the interface 145.

In step 940, which is optional, a user may be queried, through the user interface 130, to select an account to be used to provide payment for a financial transaction. If the user is not queried, a default account may be utilized as described in more depth below. For example, but not by way of limitation, the user could be prompted to select one account among a number of personal debit accounts, personal credit accounts, business credit accounts, or personal bank accounts. The user, in one implementation, makes a selection by entering an indicia through the user interface 130, such as by tapping a touch screen 250 in proximity an account indicia displayed upon the screen 250A.

In step 950, data regarding an account (such as an account number, and account security validation data) is obtained by the integrated processor 105. The integrated processor 105 may obtain the data, such as, but not by way of limitation, by retrieving account data pre-stored in the storage 110, retrieving account data utilized in a previous transaction and stored in the storage 110, or retrieving, through the interface 145, an account number stored in the memory 305 of the token or card 300. If an account indicia was provided by a user through the user interface 130 in regards to step 940, the processor 105, determines the location where the account-related data is stored, and retrieves that data accordingly. A default condition may be specified, wherein data regarding the last account number successfully used in a transaction may be selected for use in the current transaction condition.

Optional step 960 provides for the configuration of the token or card 300 to be used in a financial transaction. Once the account choice is entered or default account data selected in regards to step 940, the processor 105, through the interface

145, configures the token or card 300 with the appropriate account-related information to enable the token or card 300 to be used to provide payment for a financial transaction independently of the subscriber unit 100. As non-limiting examples, account information may be provided to and rendered in an encoding area of the token or card 300, such as by displaying a bar code representing the account information, reconfiguring a reprogrammable magnetic stripe 430 on the card 300, displaying an account number, or providing electrical signals for electrical contacts in communication with a POS terminal.

In step 970, a transaction protocol is initiated by the mobile subscriber unit 100, where data regarding an account is transferred to an external entity to effect payment for a transaction. For example, but not by way of limitation, the subscriber unit 100 receives a request, through antenna/transceiver 220, to provide an account number and account validation data, and the subscriber unit 100 transmits 980 such information through the transceiver/antenna 220 in response to the request.

In optional step 990, the user is prompted through the user interface 130 whether the subscriber unit 100, or token or card 300, is to be shut down or otherwise placed into an inactive state. If the user so specifies by entering an indicia through the user interface 130, the integrated processor 105 takes action to place the token or card 300 and/or the subscriber unit 100 in an inactive state or energy conserving mode. Optional step 995 also depicts a condition where the integrated processor 105 of the subscriber unit 100 or the embedded processor 305 of the token or card 300 begins a countdown sequence. The purpose of this countdown is to turn off the respective subscriber unit 100 or token or card 300 after a predetermined time interval if the internal battery energy source is enabled and the respective subscriber unit 100 or token or card 300 is not in use, thereby preventing inadvertent discharge of the internal power or energy source. The user may, through the user interface 130, abort the timeout automatic shutdown by entering any indicia that the subscriber unit 100 or token or card 300 is to remain in active condition.

The steps of a method, process, or algorithm described in connection with the implementations disclosed herein may be embodied directly in hardware, in a software module executed by a processor, or in a combination of the two. The various steps or acts in a method or process may be performed in the order shown in FIG. 9 may be performed in another order. Additionally, one or more process steps may be omitted or one or more process steps may be added to the processes. An additional step, block, or action may be added in the beginning, end, or intervening existing elements of such processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A mobile payment system for effecting payment for a financial transaction in a payment processing system, the mobile payment system comprising:
    a financial transaction token including:
        an onboard energy source;
        memory coupled to the onboard energy source and configured to store and retrieve data regarding an account in the payment processing system;
        an embedded processor coupled to the onboard energy source and the memory; and
        an electrical interface in communication with the embedded processor; and
    a mobile subscriber unit including:
        an integrated processor in communication with the electrical interface;
        storage, coupled to the integrated processor and configured to store and retrieve code executable by the integrated processor; and
        a transceiver coupled to the integrated processor and an antenna, wherein the integrated processor, upon detecting through the transceiver of the mobile subscriber unit an authenticated signal requesting initiation of a transaction, executes at least some of the code stored in the storage to:
            (1) command, through the electrical interface, the embedded processor of the financial transaction token to assume an active state;
            (2) configure, based on one or more commands received through a user interface, the financial transaction token to select a particular account for use in the financial transaction;
            (3) obtain, through the electrical interface, data regarding the selected account; and
            (4) transmit the data regarding the selected account through the transceiver,
        wherein the financial transaction token is removable from the mobile subscriber unit and is programmable to initiate transactions in one of two modes, wherein a first mode includes completing the financial transaction by the mobile subscriber unit as a proxy for the financial transaction token, and wherein a second mode includes completing the transaction by the financial transaction token independently of the mobile subscriber unit.

2. The mobile payment system as defined in claim 1, further comprising a power circuit in communication with the onboard energy source, the embedded processor, and the memory.

3. The mobile payment system as defined in claim 2, wherein the power circuit is in communication with the mobile subscriber unit through the electrical interface.

4. The mobile payment system as defined in claim 3, wherein:
    the electrical interface comprises means for receiving a charge status signal from the financial token; and
    the executable code further comprises code which, when executed by the integrated processor, derives a charge state of the energy source within the financial token from the received charge status signal.

5. The mobile payment system as defined in claim 3, wherein the electrical interface couples a charging current from the mobile subscriber unit to the power circuit to charge the energy source.

6. The mobile payment system as defined in claim 3, wherein the mobile subscriber unit further includes a user interface coupled to the integrated processor, the user interface comprising:
    means for data input; and
    display means, in electrical communication with the integrated processor and the power circuit, for rendering contents of the storage.

7. The mobile payment system as defined in claim 6, wherein the storage includes executable code that, when executed, causes the mobile payment system to perform commands received by the data input means.

8. The mobile payment system as defined in claim 7, wherein the storage includes executable code that, when executed, communicate a control signal communicated to the financial transaction token through an electrical communication means, whereupon the memory in the financial transaction token is erased upon the mobile subscriber unit communicating the control signal thereto.

9. The mobile payment system as defined in claim 7, wherein the storage includes executable code that, when executed, communicate a control signal communicated to the financial transaction token through an electrical communication means, whereupon the embedded processor within the financial transaction token assumes an inactive state upon the mobile subscriber unit communicating the control signal thereto.

10. The mobile payment system as defined in claim 1, wherein the onboard energy source comprises a capacitor.

11. The mobile payment system as defined in claim 1, wherein the onboard energy source comprises a thin film capacitor.

12. The mobile payment system as defined in claim 1, further comprising locking means for physically securing the financial transaction token within the mobile subscriber unit.

13. The mobile payment system as defined in claim 1, wherein the integrated processor executes the at least some of the code stored in the storage further based upon a predetermined condition indicating the initiation of the financial transaction, the predetermined condition being selected from a group consisting of:
 (1) a user entering an indicia through the user interface, the indicia indicating a request to effect payment for a financial transaction;
 (2) a user selecting a purchase of a service from a solicitation presented in the user interface;
 (3) a user placing the mobile subscriber unit within an electromagnetic field, the electromagnetic field having a predetermined communications protocol and a minimum magnitude;
 (4) a user placing the mobile subscriber unit in a point of sale terminal;
 (5) the mobile subscriber unit detecting that the mobile subscriber unit has been placed within a predetermined distance of a wireless point of sale terminal;
 (6) the integrated processor of the mobile subscriber unit detecting a request to initiate a transaction provided by the financial token through the electrical interface; and
 (7) combinations thereof.

14. The mobile payment system as defined in claim 1, wherein the mobile subscriber unit further includes an exposed region for encoding data coupled to the integrated processor, the exposed region comprising components selected from the group consisting of:
 a reprogrammable magnetic region for the encoded data;
 a set of contacts for electrically transmitting signals corresponding to the encoded data;
 a display for rendering the encoded data; and
 combinations thereof.

15. The mobile payment system as defined in claim 1, wherein the executable code in the storage of the mobile subscriber unit further comprises code that, when executed, causes the mobile subscriber unit to command, through the electrical interface, the embedded processor in the financial transaction token to assume an inactive state if the onboard energy source in the financial transaction token has been enabled for a predetermined time interval.

16. The mobile payment system as defined in claim 1, wherein the user interface includes a touch screen.

17. The mobile payment system as defined in claim 1, wherein the mobile subscriber unit further includes a biometric input device that is configured to authenticate a user of the mobile subscriber unit.

18. The mobile payment system as defined in claim 17, wherein the biometric input device is further configured to authenticate the user of the mobile subscriber unit based on one or more fingerprint scans.

19. The mobile payment system of claim 1, wherein the code stored in the storage of the mobile subscriber unit is further executed by the integrated processor to relay account information stored within the financial transaction token's memory to the mobile subscriber unit to enable the completion of the financial transaction by the mobile subscriber unit as a proxy for the financial transaction token.

20. The mobile payment system of claim 1, wherein the onboard energy source of the financial transaction token provides power to both electronics of the mobile subscriber unit and to onboard electronics of the financial transaction token in communication with the mobile subscriber unit.

21. A system for effecting a financial transaction, the system comprising:
 a financial transaction token including:
 an onboard energy source coupled to a power circuit;
 memory, coupled to the power circuit and configured to store and retrieve:
  data regarding an account; and
  embedded program code;
 an embedded processor coupled to a power circuit and the memory, the embedded processor configured to execute at least some of the embedded program code in the memory; and
 a coupler in communication with the embedded processor and the power circuit; and
 a mobile subscriber unit including:
 an integrated processor in communication with the coupler;
 storage, coupled to the processor and configured to store and retrieve code executable by the integrated processor;
 a user interface coupled to the integrated processor;
 a transceiver coupled to the integrated processor and an antenna, wherein the integrated processor, upon detecting through the transceiver of the mobile subscriber unit an authenticated signal requesting initiation of a transaction and sensing that the mobile subscriber unit has been placed within a predetermined distance of a wireless point of sale terminal, executes at least some code in the storage to:
  (1) command the embedded processor in the financial transaction token to assume an active state;
  (2) configure, based on one or more commands received through the user interface, the financial transaction token to select a particular account for use in the financial transaction;
  (3) obtain, through the coupler, data regarding the selected account; and
  (4) transmit the data regarding the selected account through the transceiver,
 wherein the financial transaction token is removable from the mobile subscriber unit and is programmable to initiate transactions in one of two modes, wherein a first mode includes completing the financial transaction by the mobile subscriber unit as a proxy for the financial transaction token, and wherein a second mode includes completing the transaction by the financial transaction token independently of the mobile subscriber unit.

22. The mobile payment system as defined in claim 21, wherein upon being commanded to the active state, the embedded processor:
receives an authenticating indicia;
compares the authenticating indicia to a predetermined authenticating indicia pre-stored in the storage; and
authorizes the transaction if a result of the comparison of the authenticating indicia to the pre-stored indicia is within a predetermined threshold.

23. The mobile payment system as defined in claim 22, wherein the authenticating indicia is transmitted by the mobile subscriber unit to the embedded processor through the coupler.

24. The mobile payment system as defined in claim 21, wherein the onboard energy source comprises a capacitor.

25. The mobile payment system as defined in claim 21, wherein the onboard energy source comprises a thin film capacitor.

26. The mobile payment system as defined in claim 21, further comprising locking means for physically securing the financial transaction token within the mobile subscriber unit.

27. The mobile payment system as defined in claim 21 wherein:
the coupler comprises means for receiving a charge status signal from the financial token; and
the executable code further comprises code which, when executed by the integrated processor, derives a charge state of the energy source within the financial token from the received charge status signal.

28. The mobile payment system as defined in claim 21, wherein a charging current is transmitted through the coupler from the mobile subscriber unit to the power circuit to charge the energy source.

29. The mobile payment system as defined in claim 21, wherein the storage includes executable code that, when executed, communicate a control signal communicated to the financial transaction token through an electrical communication means, whereupon the embedded processor within the financial transaction token assumes an inactive state upon the mobile subscriber unit communicating the control signal thereto.

30. The mobile payment system as defined in claim 21, wherein the integrated processor executes the at least some of the code stored in the storage further based upon a predetermined condition indicating the initiation of the financial transaction, the predetermined condition being selected from a group consisting of:
(1) a user entering an indicia through the user interface, the indicia indicating a request to effect payment for a financial transaction;
(2) a user selecting a purchase of a service from a solicitation presented in the user interface;
(3) a user placing the mobile subscriber unit within an electromagnetic field, the electromagnetic field having a predetermined communications protocol and a minimum magnitude;
(4) a user placing the mobile subscriber unit in a point of sale terminal;
(5) the mobile subscriber unit detecting, through the transceiver, an authenticated signal requesting initiation of a transaction;
(6) the integrated processor of the mobile subscriber unit detecting a request to initiate a transaction provided by the financial token through the electrical interface; and
(7) combinations thereof.

31. A mobile payment system for effecting a financial transaction in a payment processing system, the mobile payment system comprising:
a reprogrammable financial transaction card comprising: a substantially rigid substrate;
a reprogrammable magnetic stripe assembly, coupled to a power circuit and proximal the substrate, for encoding data including an account for effecting the payment for a transaction;
a thin film capacitor proximal the substrate and coupled to the power circuit, wherein the thin film capacitor is adapted to energize energizes the power circuit as an internal power source;
an embedded processor located within a cavity defined within the substrate and coupled to the power circuit and to a data interface;
an electrical interface coupled to the embedded processor and the power circuit; and memory, coupled to the power circuit and the embedded processor, and including code executable to: accept, using the electrical interface, commands for encoding data for an exposed region; and
perform the commands accepted from the electrical interface; and
a mobile subscriber unit including:
a cavity defined within the mobile subscriber unit for retaining the financial transaction card;
an integrated processor coupled to the electrical interface; storage, coupled to the integrated processor and configured to store and retrieve code executable by the integrated processor;
a user interface coupled to the integrated processor; and
a transceiver coupled to the integrated processor and an antenna, wherein the integrated processor, executes at least some code in the storage to:
(1) command the embedded processor in the financial transaction card to assume an active state;
(2) configure, based on one or more commands received through the user interface, the financial transaction card to select a particular account for use in the financial transaction;
(3) obtain, through the electrical interface, data regarding the selected account; and
(4) transmit the data regarding the selected account through the transceiver, wherein the financial transaction token is removable from the mobile subscriber unit and is programmable to initiate transactions in one of two modes, wherein a first mode includes completing the financial transaction by the mobile subscriber unit as a proxy for the financial transaction token, and wherein a second mode includes completing the transaction by the financial transaction token independently of the mobile subscriber unit.

32. The mobile payment system as defined in claim 31, wherein upon being commanded to the active state, the embedded processor:
receives an authenticating indicia; compares the authenticating indicia to a predetermined authenticating indicia pre-stored in the storage; and
authorizes the transaction if a result of the comparison of the authenticating indicia to the pre-stored indicia is within a predetermined threshold.

33. The mobile payment system as defined in claim 32, wherein the mobile subscriber unit prompts a user to enter the authenticating indicia through the user interface.

34. The mobile payment system as defined in claim 32, wherein the authenticating indicia is transmitted by the mobile subscriber unit to the embedded processor through the electrical interface.

35. The mobile payment system as defined in claim 31, further comprising locking means for physically securing the financial transaction card within the cavity defined within the mobile subscriber unit.

36. The mobile payment system as defined in claim 31 wherein:
the electrical interface comprises means for receiving a charge status signal from the financial transaction card; and
the executable code further comprises code which, when executed by the integrated processor, derives a charge state of the energy source within the financial transaction card from the received charge status signal.

37. The mobile payment system as defined in claim 31, wherein the electrical interface couples a charging current from the mobile subscriber unit to the power circuit to charge the thin film capacitor.

38. The mobile payment system as defined in claim 31, wherein the storage includes executable code that, when executed, communicate a control signal communicated to the financial transaction card through an electrical communication means, whereupon the embedded processor within the financial transaction card assumes an inactive state upon the mobile subscriber unit communicating the control signal thereto.

39. The mobile payment system as defined in claim 31, wherein the integrated processor executes the at least some of the code stored in the storage further based upon a predetermined condition indicating the initiation of the financial transaction, the predetermined condition being selected from a group consisting of:

(1) a user entering an indicia through the user interface, the indicia indicating a request to effect payment for a financial transaction;
(2) sensing that the mobile subscriber unit has been placed within a predetermined distance of a wireless point of sale terminal;
(3) a user selecting a purchase of a service from a solicitation presented in the user interface;
(4) a user placing the mobile subscriber unit within an electromagnetic field, the electromagnetic field having a predetermined communications protocol and a minimum magnitude;
(5) a user placing the mobile subscriber unit in a point of sale terminal;
(6) the integrated processor of the mobile subscriber unit detecting a request to initiate a transaction provided by the financial card through the electrical interface; and
(7) combinations thereof.

40. The mobile payment system as defined in claim 31, wherein upon being commanded to the active state, the embedded processor:
receives, through the electrical interface, a request to authorize the transaction, said request including at least a monetary amount necessary to effect payment for the financial transaction;
compares the monetary amount to a pre-stored value indicia in the memory, wherein:
if the monetary amount is less than or equal to the pre-stored value indicia, the embedded processor:
sends to the integrated processor, through the electrical interface, a signal indicating the transaction is authorized; and
decrements the pre-stored value indicia by an amount corresponding to the monetary amount; otherwise, if the monetary amount is greater than the pre-stored value indicia, the embedded processor sends to the integrated processor, through the electrical interface, a signal indicating the transaction is not authorized.

* * * * *

UNITED STATES PATENT AND TRADEMARK OFFICE
CERTIFICATE OF CORRECTION

PATENT NO. : 8,733,632 B2  
APPLICATION NO. : 11/767185  
DATED : May 27, 2014  
INVENTOR(S) : Patrick L. Faith and Ayman A. Hammad Page 1 of 1

It is certified that error appears in the above-identified patent and that said Letters Patent is hereby corrected as shown below:

In the Claims:

In Column 18, lines 15-16, delete "is adapted to energize"

Signed and Sealed this
Fourteenth Day of October, 2014

Michelle K. Lee
*Deputy Director of the United States Patent and Trademark Office*